United States Patent [19]

Tran

[11] Patent Number: 5,784,580
[45] Date of Patent: Jul. 21, 1998

[54] SYSTEM AND METHOD FOR COMMUNICATING BETWEEN DEVICES

[75] Inventor: Cang Tran, Austin, Tex.

[73] Assignee: International Business Machines Corporation, Armonk, N.Y.

[21] Appl. No.: 673,394

[22] Filed: Jun. 28, 1996

[51] Int. Cl.[6] .................................................. G06F 13/00
[52] U.S. Cl. ........................................................ 395/287
[58] Field of Search .................................. 395/290, 287

[56] References Cited

U.S. PATENT DOCUMENTS 4,622,630  11/1986  Vora et al. ............................ 364/134
5,142,689  8/1992  Eisenack ............................... 395/287
5,448,703  9/1995  Amini et al. .......................... 395/290
5,506,968  4/1996  Dukes .................................. 395/728

Primary Examiner—Ayaz R. Sheikh
Assistant Examiner—David A. Wiley
Attorney, Agent, or Firm—Casimer K. Salys; Michael A. Davis, Jr.

[57] ABSTRACT

During a first cycle, data information is output through a bus from a device coupled to the bus. During a second cycle immediately after the first cycle, address information is output through the bus from the device.

27 Claims, 3 Drawing Sheets

1

SYSTEM AND METHOD FOR COMMUNICATING BETWEEN DEVICES

TECHNICAL FIELD

This patent application relates in general to information processing systems and in particular to a method and system for communicating between devices.

BACKGROUND

In an information processing system, devices are able to communicate information between one another through a system bus. A typical system bus may include an address/data bus and a control bus. Bus protocols are established to support and govern synchronous communication of information between such devices through the address/data bus.

According to one technique, both address information and data information are transferred between the devices through the address/data bus in a time multiplexed fashion. Typically, address information is transferred between the devices through the address/data bus, then subsequently data information is transferred between the devices through the address/data bus. The transferred address information specifies an address at which the subsequently transferred data information is stored within a memory device of the information processing system.

In order to avoid contention on the address/data bus between potentially conflicting signals from multiple devices, a typical bus protocol requires that no more than one of the devices is allowed to output information to the address/data bus during any particular cycle of the information processing system. Such a technique reduces the possibility of unstable logic states on the address/data bus and of damage to electronic circuitry which is connected to the address/data bus.

To achieve such a goal, a previous typical bus protocol requires a "null" cycle after a device finishes outputting data information through the address/data bus. During the null cycle, no further activity occurs on the address/data bus. It is only during one or more subsequent cycles after the null cycle that a device is allowed to output further address information through the system bus. A shortcoming of such a previous technique is that a null cycle introduces latency and thereby reduces the system bus's overall information throughput capacity and performance.

Thus, a need exists for a method and system for communicating between devices, in which a bus's overall information throughput capacity and performance are improved.

SUMMARY

During a first cycle, data information is output through a bus from a device coupled to the bus. During a second cycle immediately after the first cycle, address information is output through the bus from the device.

It is a technical advantage that a bus's overall information throughput capacity and performance are improved.

BRIEF DESCRIPTION OF THE DRAWINGS

An illustrative embodiment and its advantages are better understood by referring to the following descriptions and accompanying drawings, in which.

DETAILED DESCRIPTION

Figure 1:
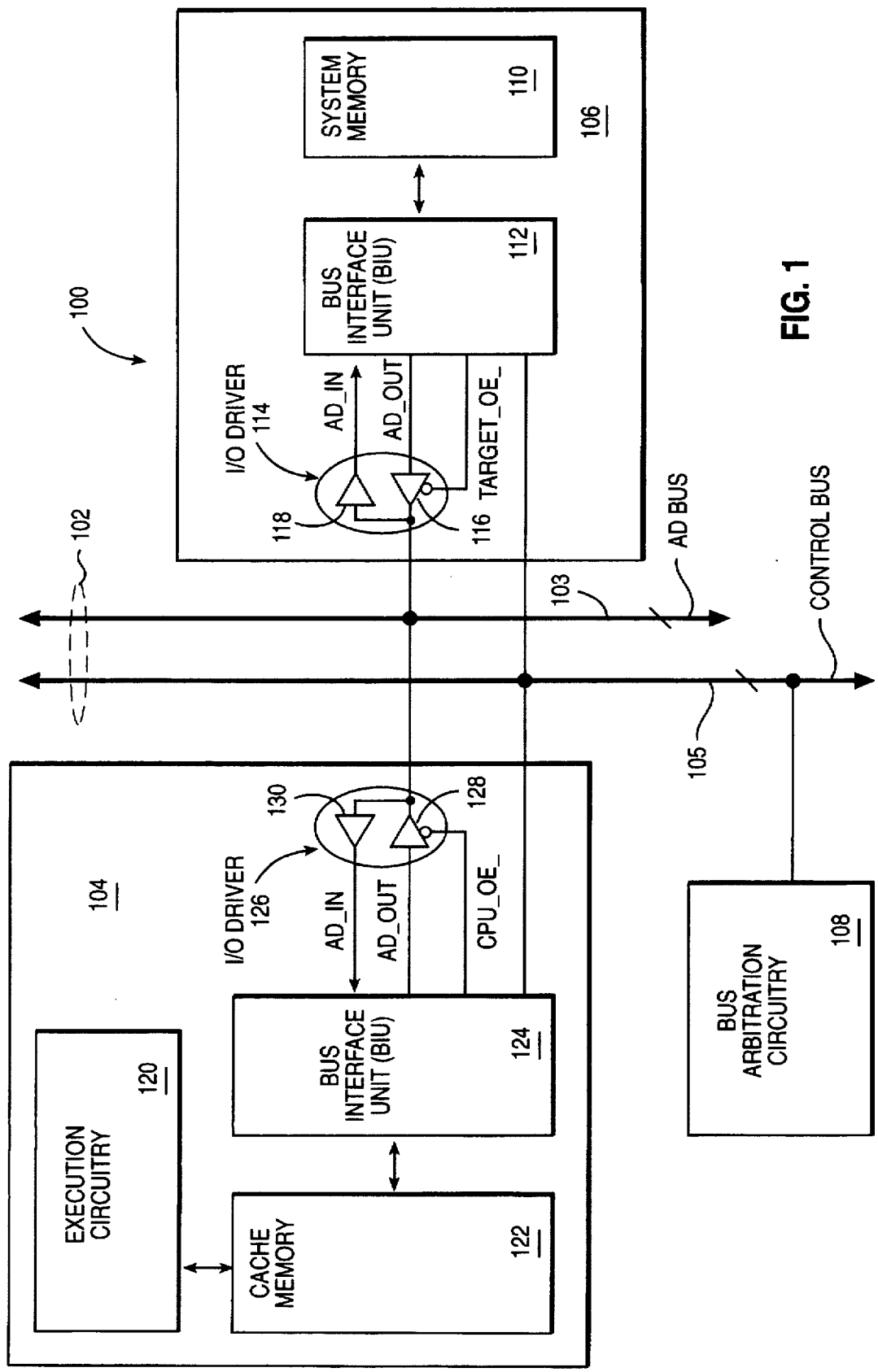
FIG. 1 is a block diagram of an information processing system according to an illustrative embodiment.
Figure 2:
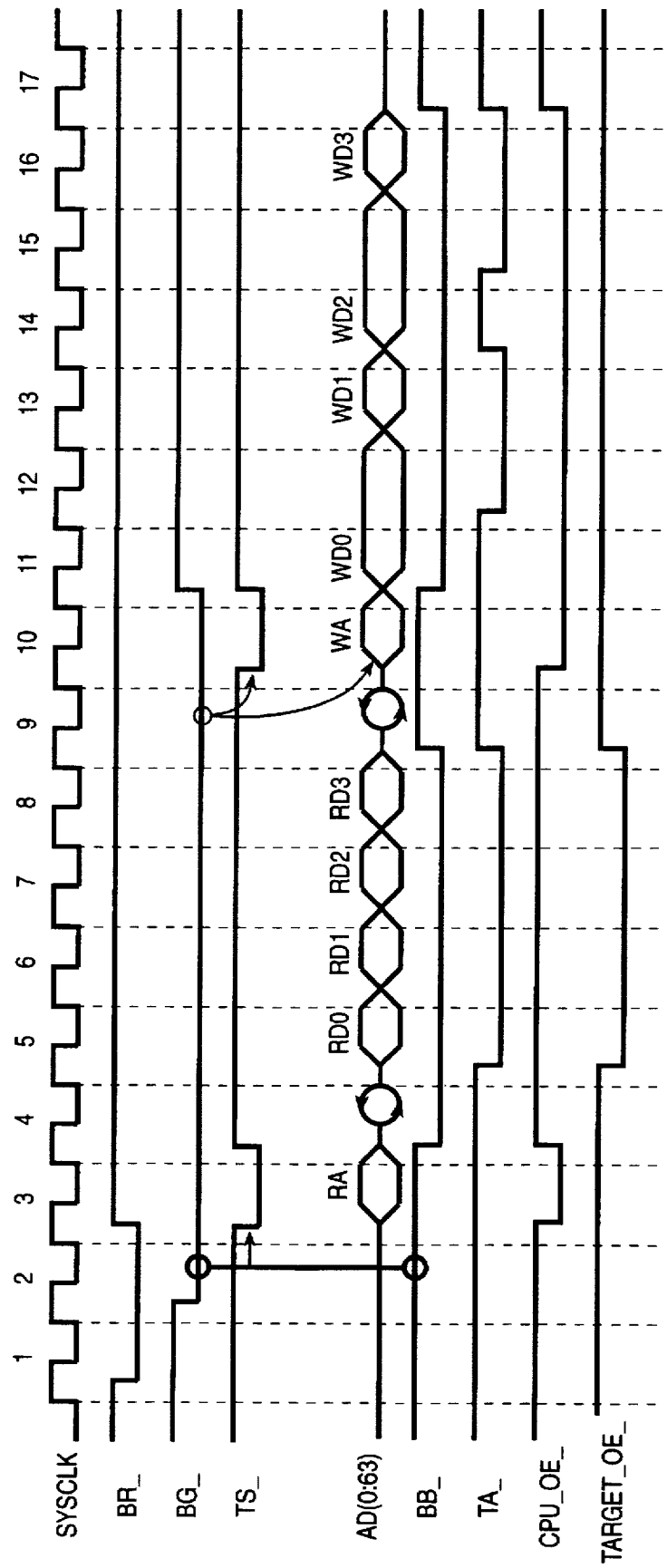
FIG. 2 is a timing diagram of a read operation followed by a write operation in the information processing system of FIG. 1.
Figure 3:
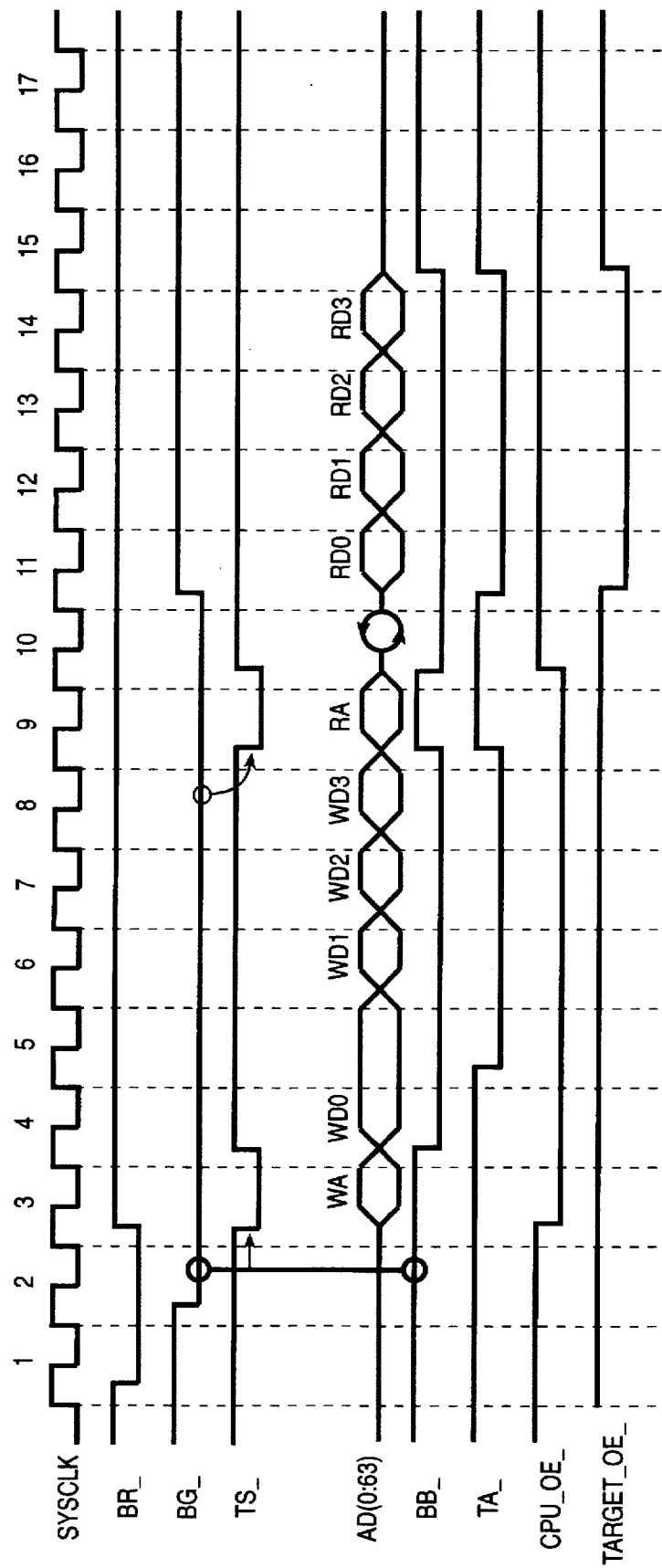
FIG. 3 is a timing diagram of a write operation followed by a read operation in the information processing system of FIG. 1.

An illustrative embodiment and its advantages are better understood by referring to FIGS. 1–3 of the drawings.

FIG. 1 is a block diagram of an information processing system, indicated generally at 100, according to an illustrative embodiment. As shown in FIG. 1, system 100 includes a system bus, indicated by dashed enclosure 102. Further, system 100 includes multiple bus devices, namely a processor device 104 and a memory device 106. Also, system 100 includes bus arbitration circuitry 108. Processor device 104 and memory device 106 are connected to one another through system bus 102, and they communicate information to one another through system bus 102.

System bus 102 includes an address/data information ("AD") bus 103 and a control bus 105. As indicated in FIG. 1, each of AD bus 103 and control bus 105 includes a respective set of multiple lines. In the illustrative embodiment, AD bus 103 is a bi-directional 64-bit bus through which address information and data information are transferred between processor device 104 and memory device 106. More particularly, 32-bit address information and 64-bit data information are time multiplexed on AD bus 103, as discussed further hereinbelow in connection with FIGS. 2 and 3.

Control bus 105 includes a set of multiple lines as discussed further hereinbelow in connection with FIGS. 2 and 3, but which for clarity are not shown in FIG. 1. More specifically, control bus 105 includes system clock ("SYSCLK"), bus request ("BR_"), bus grant ("BG_"), transfer start ("TS_"), bus busy ("BB_"), and transfer acknowledge ("TA_") lines. Each of BR_, BG_, TS_, BB_ and TA_ distributes a respective signal which is active low, such that the signal is asserted "true" if it has a low voltage logic 0 state. BR_, BG_, TS_, BB_ and TA_ are discussed further hereinbelow in connection with FIGS. 2 and 3.

Memory device 106 includes a system memory 110, a bus interface unit ("BIU") 112, and an input/output ("I/O") driver 114. I/O driver 114 includes a tri-state driver 116 and a driver 118. As shown in FIG. 1, system memory 110 is coupled through BIU 112 to system bus 102. More particularly, BIU 112 is connected to control bus 105. Also, BIU 112 is coupled through I/O driver 114 to AD bus 103. Accordingly, an information output ("AD_OUT") of BIU 112 is connected to an information input of driver 116, an enable output ("TARGET_OE_") of BIU 112 is connected to an enable input of driver 116, and an information input ("AD_IN") of BIU 112 is connected to an information output of driver 118. AD bus 103 is connected to an information input of driver 118 and to an output of driver 116.

Memory device 106 stores information at various addresses within system memory 110. As shown in FIG. 1, BIU 112 and I/O driver 114 are integral with memory device 106.

Processor device 104 includes execution circuitry 120, a cache memory 122, a BIU 124, and an I/O driver 126. I/O driver 126 includes a tri-state driver 128 and a driver 130. As shown in FIG. 1, execution circuitry 120 is connected to cache memory 122. Cache memory 122 is coupled through BIU 124 to system bus 102. More particularly, BIU 124 is connected to control bus 105. Also, BIU 124 is coupled through I/O driver 126 to AD bus 103. Accordingly, an information output ("AD_OUT") of BIU 124 is connected to an information input of driver 128, an enable output ("CPU_OE_") of BIU 124 is connected to an enable input of driver 128, and an information input ("AD_IN") of BIU 124 is connected to an information output of driver 130. AD bus 103 is connected to an information input of driver 130 and to an output of driver 128.

In the illustrative embodiment, processor device 104 operates according to reduced instruction set computing ("RISC") techniques. Also, in the illustrative embodiment, processor device 104 is a single integrated circuit superscalar microprocessor. Accordingly, execution circuitry 120 of processor device 104 includes various units, registers, buffers, memories, and other sections, all of which are formed by integrated circuitry. As shown in FIG. 1, execution circuitry 120, cache memory 122, BIU 124 and I/O driver 126 are integral with processor device 104, all being formed by integrated circuitry as part of a single integrated circuit.

Each of TARGET_OE_ and CPU_OE_ distributes a respective signal which is active low, such that the signal is asserted "true" if it has a low voltage logic 0 state. BIU 112 of memory device 106 suitably asserts TARGET_OE_ in order to enable driver 116 to control AD bus 103. Likewise, BIU 124 of processor device 104 suitably asserts CPU_OE_ in order to enable driver 128 to control AD bus 103. If neither CPU_OE_ nor TARGET_OE_ is asserted, then AD bus 103 has a high impedance state which is controlled by neither processor device 104 nor memory device 106. In a significant aspect of the illustrative embodiment, in order to avoid contention on AD bus 103 between potentially conflicting signals from BIU 112 (through driver 116) and BIU 124 (through driver 128), no more than one of CPU_OE_ and TARGET_OE_ is asserted during any particular cycle of system 100. This is discussed further hereinbelow in connection with FIGS. 2 and 3.

FIG. 2 is a timing diagram of a read operation followed by a write operation in system 100. A read operation is an information transfer event in which processor device 104 reads (i.e. "loads", "receives" or "inputs") information from memory device 106. By comparison, a write operation is an information transfer event in which processor device 104 writes (i.e. "stores", "transmits" or "outputs") information to memory device 106.

Referring to FIG. 2, through SYSCLK, a conventional system clock signal is distributed. During a cycle 1, processor device 104 initially asserts BR_ (and continuously asserts BR_ until early in a cycle 3) to request control of system bus 102 from bus arbitration circuitry 108. During a cycle 2, bus arbitration circuitry 108 initially asserts BG_ (and continuously asserts BG_ until early in a cycle 11) in order to grant control (i.e. "ownership") of system bus 102 to processor device 104, in response (a) to the assertion of BR_ by processor device 104 during cycle 1 and (b) to BB_ having a logic 1 state during cycle 2 which thereby indicates that no data phase of an information transfer event is active on AD bus 103.

During cycle 3, processor device 104 initially asserts CPU_OE_ (and continuously asserts CPU_OE_ until early in a cycle 4) to enable driver 128, and memory device 106 sets TARGET_OE_ to a logic 1 state in order to disable driver 116. As shown in FIG. 2, during preceding cycle 1 before cycle 3, memory device 106 had already disabled driver 116 so that memory device 106 disables driver 116 continuously from cycle 1 until early in a cycle 5.

Also during cycle 3, processor device 104 outputs a read address RA through enabled driver 128 to AD bus 103, and processor device 104 initially asserts TS_ (and continuously asserts TS_ until early in cycle 4) to indicate that processor device 104 is outputting a valid address through driver 128. Moreover, during cycle 3, BIU 112 of memory device 106 receives address RA through driver 118 from AD bus 103 (and thus from processor device 104), and BIU 112 initiates an operation in which BIU 112 reads information stored at address RA within system memory 110.

During cycle 4, processor device 104 initially asserts BB_ (and continuously asserts BB_ until early in a cycle 9) to indicate that processor device 104 is in a data phase of an information transfer event, during which information is transferred between processor device 104 and memory device 106. With respect to AD bus 103, cycle 4 is a null period during which no further activity occurs on AD bus 103. During this null period of cycle 4, BIU 112 has an opportunity to read information stored at address RA within system memory 110, and processor device 104 sets CPU_OE_ to a logic 1 state so that processor device 104 disables driver 128 continuously from cycle 4 until early in a cycle 10.

During cycle 5, memory device 106 asserts TARGET_OE_ to enable driver 116, and processor device 104 continues disabling driver 128. As just described and as shown in FIG. 2, processor device 104 had initially disabled driver 128 during cycle 4. By comparison, memory device 106 waits until cycle 5 to enable driver 116. In this manner, system 100 ensures that no more than one of CPU_OE_ and TARGET_OE_ is asserted during cycle 5 (i.e. only TARGET_OE_ is asserted during cycle 5), so that system 100 avoids contention on AD bus 103 between potentially conflicting signals from BIU 112 (through driver 116) and BIU 124 (through driver 128).

Also during cycle 5, BIU 112 of memory device 106 outputs information RD0 through enabled driver 116 to AD bus 103 in response to the address RA which was previously output by processor device 104 during cycle 3. During such an information transfer event in which processor device 104 reads information from memory device 106, memory device 106 initially asserts TA_ during cycle 5 (and continuously asserts TA_ until early in cycle 9) to indicate that BIU 112 of memory device 106 is outputting valid information (to processor device 104) through driver 116.

Further during cycle 5, BIU 124 of processor device 104 receives information RD0 through driver 130 from AD bus 103 (and thus from memory device 106). Likewise, during cycles 6, 7 and 8, processor device 104 receives information RD1, RD2 and RD3 respectively from memory device 106. Information RD0, RD1, RD2 and RD3 are stored by memory device 106 at addresses RA, RA+8, RA+16 and RA+24, respectively, within system memory 110. Each of RD0, RD1, RD2 and RD3 is 64-bits (i.e. 8 bytes) in length.

During cycle 9, system 100 ends the read operation. More particularly, during cycle 9, processor device 104 sets BB_ to a logic 1 state in order to indicate that processor device 104 is no longer in the data phase of an information transfer event. Also during cycle 9, memory device 106 sets TA_ to a logic 1 state in order to indicate that BIU 112 of memory device 106 is no longer outputting valid information (to processor device 104) through driver 116.

With respect to AD bus 103, cycle 9 is a null period during which no further activity occurs on AD bus 103. During this null period of cycle 9, memory device 106 sets TARGET_OE_ to a logic 1 state so that memory device 104 disables driver 116 continuously from cycle 9 and thereafter at least beyond cycle 17.

During cycle 10, processor device 104 initially asserts CPU_OE_ (and continuously asserts CPU_OE_ until early in cycle 17) to enable driver 128, and memory device 106 continues disabling driver 116. As just described and as shown in FIG. 2, memory device 106 had initially disabled driver 116 during cycle 9. By comparison, processor device 104 waits until cycle 10 to enable driver 128. In this manner, system 100 ensures that no more than one of CPU_OE_ and TARGET_OE_ is asserted during cycle 10 (i.e. only CPU_OE_ is asserted during cycle 10), so that system 100 avoids contention on AD bus 103 between potentially conflicting signals from BIU 112 (through driver 116) and BIU 124 (through driver 128).

Also during cycle 10, processor device 104 outputs a write address WA through enabled driver 128 to AD bus 103, and processor device 104 initially asserts TS_ (and continuously asserts TS_ until early in cycle 11) to indicate that processor device 104 is outputting a valid address through driver 128. Moreover, during cycle 10, BIU 112 of memory device 106 receives address WA through driver 118 from AD bus 103 (and thus from processor device 104).

During cycle 11, BIU 124 of processor device 104 outputs information WD0 (and continuously outputs information WD0 until early in cycle 13) through enabled driver 128 to AD bus 103. Also during cycle 11, processor device 104 initially asserts BB_ (and continuously asserts BB_ until early in cycle 17) to indicate that processor device 104 is in a data phase of an information transfer event, during which information is transferred between processor device 104 and memory device 106. Moreover, during cycle 11, bus arbitration circuitry 108 sets BG_ to a logic 1 state in order to withdraw control of system bus 102 away from processor device 104; nevertheless, bus arbitration circuitry 108 does not grant control of system bus 102 to another device during the period when BB_ is asserted.

During such an information transfer event in which processor device 104 writes information to memory device 106, memory device 106 initially asserts TA_ during cycle 12 (and continuously asserts TA_ until early in cycle 14). Since TA_ is asserted at the beginning of cycle 13, BIU 112 of memory device 106 indicates that it is successfully receiving information WD0 through driver 118 from AD bus 103 (and thus from processor device 104). While TA_ is asserted, BIU 112 stores the received information WD0. During a later cycle after cycle 12, BIU 112 of memory device 106 stores the received information WD0 at address WA (which was previously output by processor device 104 during cycle 10) within system memory 110.

In response to TA_ being asserted at the beginning of cycle 13, BIU 124 of processor device 104 finishes outputting information WD0 and instead outputs information WD1 through enabled driver 128 to AD bus 103 during cycle 13. While TA_ is asserted, BIU 112 of memory device 106 stores the received information WD1. During a later cycle after cycle 13, BIU 112 of memory device 106 stores the received information WD1 at address WA+8 within system memory 110.

Likewise, in response to TA_ being asserted at the beginning of cycle 14, BIU 124 of processor device 104 finishes outputting information WD1 and instead outputs information WD2 through enabled driver 128 to AD bus 103 during cycle 14. During cycle 14, BIU 112 of memory device 106 sets TA_ to a logic 1 state, thereby indicating that BIU 112 is no longer successfully receiving information WD2 through driver 118 from AD bus 103 (and thus from processor device 104). Accordingly, processor device 104 continuously outputs information WD2 until early in cycle 16.

During cycle 15, memory device 106 initially asserts TA_ (and continuously asserts TA_ until early in cycle 17). Since TA_ is asserted at the beginning of cycle 16, BIU 112 of memory device 106 indicates that it is successfully receiving information WD2 through driver 118 from AD bus 103 (and thus from processor device 104). While TA_ is asserted, BIU 112 of memory device 106 stores the received information WD2. During a later cycle after cycle 15, BIU 112 of memory device 106 stores the received information WD2 at address WA+16 within system memory 110.

In response to TA_ being asserted at the beginning of cycle 16, BIU 124 of processor device 104 finishes outputting information WD2 and instead outputs information WD3 through enabled driver 128 to AD bus 103 during cycle 16. While TA_ is asserted, BIU 112 of memory device 106 stores the received information WD3. During a later cycle after cycle 16, BIU 112 of memory device 106 stores the received information WD3 at address WA+24 within system memory 110. Each of WD0, WD1, WD2 and WD3 is 64-bits (i.e. 8 bytes) in length.

In response to TA_ being asserted at the beginning of cycle 17, BIU 124 of processor device 104 finishes outputting information WD3. Moreover, during cycle 17, processor device 104 sets each of BB_ and CPU_OE_ to a logic 1 state. Also during cycle 17, BIU 112 of memory device 106 sets TA_ to a logic 1 state.

FIG. 3 is a timing diagram of a write operation followed by a read operation in system 100. Referring to FIG. 3, through SYSCLK, a conventional system clock signal is distributed. During a cycle 1, processor device 104 initially asserts BR_ (and continuously asserts BR_ until early in a cycle 3) to request control of system bus 102 from bus arbitration circuitry 108. During a cycle 2, bus arbitration circuitry 108 initially asserts BG_ (and continuously asserts BG_ until early in a cycle 11) in order to grant control of system bus 102 to processor device 104, in response (a) to the assertion of BR_ by processor device 104 during cycle 1 and (b) to BB_ having a logic 1 state during cycle 2 which thereby indicates that no data phase of an information transfer event is active on AD bus 103.

During cycle 3, processor device 104 initially asserts CPU_OE_ (and continuously asserts CPU_OE_ until early in a cycle 10) to enable driver 128, and memory device 106 sets TARGET_OE_ to a logic 1 state in order to disable driver 116. As shown in FIG. 3, during preceding cycle 1 before cycle 3, memory device 106 had already disabled driver 116 so that memory device 106 disables driver 116 continuously from cycle 1 until early in a cycle 11.

Also during cycle 3, processor device 104 outputs a write address WA through enabled driver 128 to AD bus 103, and processor device 104 initially asserts TS_ (and continuously asserts TS_ until early in cycle 4) to indicate that processor device 104 is outputting a valid address through driver 128. Moreover, during cycle 3, BIU 112 of memory device 106 receives address WA through driver 118 from AD bus 103 (and thus from processor device 104).

During cycle 4, BIU 124 of processor device 104 outputs information WD0 (and continuously outputs information WD0 until early in cycle 6) through enabled driver 128 to AD bus 103. Also during cycle 4, processor device 104 initially asserts BB_ (and continuously asserts BB_ until early in cycle 9) to indicate that processor device 104 is in a data phase of an information transfer event, during which information is transferred between processor device 104 and memory device 106.

During such an information transfer event in which processor device 104 writes information to memory device 106, memory device 106 initially asserts TA__ during cycle 5 (and continuously asserts TA__ until early in cycle 9). Since TA__ is asserted at the beginning of cycle 6, BIU 112 of memory device 106 indicates that it is successfully receiving information WD0 through driver 118 from AD bus 103 (and thus from processor device 104). While TA__ is asserted, BIU 112 stores the received information WD0. During a later cycle after cycle 5, BIU 112 of memory device 106 stores the received information WD0 at address WA (which was previously output by processor device 104 during cycle 3) within system memory 110.

In response to TA__ being asserted at the beginning of cycle 6, BIU 124 of processor device 104 finishes outputting information WD0 and instead outputs information WD1 through enabled driver 128 to AD bus 103 during cycle 6. While TA__ is asserted, BIU 112 of memory device 106 stores the received information WD1. During a later cycle after cycle 6, BIU 112 of memory device 106 stores the received information WD1 at address WA+8 within system memory 110.

Likewise, in response to TA__ being asserted at the beginning of cycle 7, BIU 124 of processor device 104 finishes outputting information WD1 and instead outputs information WD2 through enabled driver 128 to AD bus 103 during cycle 7. While TA__ is asserted, BIU 112 of memory device 106 stores the received information WD2. During a later cycle after cycle 7, BIU 112 of memory device 106 stores the received information WD1 at address WA+16 within system memory 110.

In response to TA__ being asserted at the beginning of cycle 8, BIU 124 of processor device 104 finishes outputting information WD2 and instead outputs information WD3 through enabled driver 128 to AD bus 103 during cycle 8. While TA__ is asserted, BIU 112 of memory device 106 stores the received information WD3. During a later cycle after cycle 8, BIU 112 of memory device 106 stores the received information WD3 at address WA+24 within system memory 110. Each of WD0, WD1, WD2 and WD3 is 64-bits (i.e. 8 bytes) in length.

In response to TA__ being asserted at the beginning of cycle 9, BIU 124 of processor device 104 finishes outputting information WD3. Moreover, during cycle 9, processor device 104 sets BB__ to a logic 1 state. Also during cycle 9, BIU 112 of memory device 106 sets TA__ to a logic 1 state.

In a significant aspect of the illustrative embodiment, during cycle 9, processor device 104 continues asserting CPU_OE__ to enable driver 128; thus, processor device 104 continues maintaining (i.e. does not relinquish) control (i.e. "ownership") of system bus 102, and bus arbitration circuitry 108 recognizes this fact as indicated in FIG. 3 by bus arbitration circuitry 108 continuing to assert BG__ during cycles 9 and 10. As shown in FIG. 3, during a preceding cycle 3 before cycle 9, processor device 104 had initially enabled driver 128 so that processor device 104 enables driver 128 continuously from cycle 3 until early in cycle 10. Likewise, as shown in FIG. 3, during a preceding cycle 1 before cycle 9, memory device 104 had initially disabled driver 116 so that memory device 106 disables driver 116 continuously from cycle 1 until early in cycle 11.

Accordingly, in a significant aspect of the illustrative embodiment, during cycle 9 immediately after cycle 8, processor device 104 continues asserting CPU_OE__ to continue enabling driver 128, and processor device 104 outputs a read address RA through enabled driver 128 to AD bus 103. Also during cycle 9, processor device 104 initially asserts TS__ (and continuously asserts TS__ until early in cycle 10) to indicate that processor device 104 is outputting a valid address through driver 128. Moreover, during cycle 9, BIU 112 of memory device 106 receives address RA through driver 118 from AD bus 103 (and thus from processor device 104), and BIU 112 initiates an operation in which BIU 112 reads information stored at address RA within system memory 110.

During cycle 10, processor device 104 initially asserts BB__ (and continuously asserts BB__ until early in cycle 15) to indicate that processor device 104 is in a data phase of an information transfer event, during which information is transferred between processor device 104 and memory device 106. With respect to AD bus 103, cycle 10 is a null period during which no further activity occurs on AD bus 103. During this null period of cycle 10, BIU 112 has an opportunity to read information stored at address RA within system memory 110, and processor device 104 sets CPU_OE__ to a logic 1 state so that processor device 104 disables driver 128 continuously from cycle 10 and thereafter at least beyond cycle 17.

During cycle 11 (after cycle 9), memory device 106 initially asserts TARGET_OE__ (and continuously asserts TARGET_OE__ until early in cycle 15) to enable driver 116, and processor device 104 continues setting CPU_OE__ to a logic 1 state in order to continue disabling driver 128. As just described and as shown in FIG. 3, processor device 104 had initially disabled driver 128 during an intervening cycle 10 before cycle 11 and after cycle 9, so that processor device 104 disables driver 128 continuously between cycles 10 and 11 and thereafter at least beyond cycle 17. By comparison, memory device 106 waits until cycle 11 to enable driver 116. In this manner, system 100 ensures that no more than one of CPU_OE__ and TARGET_OE__ is asserted during cycle 11 (i.e. only TARGET_OE__ is asserted during cycle 11), so that system 100 avoids contention on AD bus 103 between potentially conflicting signals from BIU 112 (through driver 116) and BIU 124 (through driver 128).

Also during cycle 11, BIU 112 of memory device 106 outputs information RD0 through enabled driver 116 to AD bus 103 in response to the address RA which was previously output by processor device 104 during cycle 9. During such an information transfer event in which processor device 104 reads information from memory device 106, memory device 106 initially asserts TA__ during cycle 11 (and continuously asserts TA__ until early in cycle 15) to indicate that BIU 112 of memory device 106 is outputting valid information (to processor device 104) through driver 116.

Further during cycle 11, bus arbitration circuitry 108 sets BG__ to a logic 1 state in order to withdraw control of system bus 102 away from processor device 104; nevertheless, bus arbitration circuitry 108 does not grant control of system bus 102 to another device during the period when BB__ is asserted.

Moreover, during cycle 11, BIU 124 of processor device 104 receives information RD0 through driver 130 from AD bus 103 (and thus from memory device 106). Likewise, during cycles 12, 13 and 14, processor device 104 receives information RD1, RD2 and RD3 respectively from memory device 106. Information RD0, RD1, RD2 and RD3 are stored by memory device 106 at addresses RA, RA+8, RA+16 and RA+24, respectively, within system memory 110. Each of RD0, RD1, RD2 and RD3 is 64-bits (i.e. 8 bytes) in length.

During cycle 15, system 100 ends the read operation. More particularly, during cycle 15, processor device 104 sets BB__ to a logic 1 state in order to indicate that processor device 104 is no longer in the data phase of an information transfer event. Also during cycle 15, memory device 106 sets TA__ to a logic 1 state in order to indicate that BIU 112 of memory device 106 is no longer outputting valid information (to processor device 104) through driver 116. Moreover, during cycle 15, memory device 106 sets TARGET_OE__ to a logic 1 state.

From the above discussion, it is apparent that system 100 of the illustrative embodiment achieves significant technical advantages. For example, according to a previous typical bus protocol, a null cycle occurs after a device finishes outputting data information through the address/data bus. During the null cycle, no further activity occurs on the address/data bus. It is only during one or more subsequent cycles after the null cycle that a device is allowed to output further address information through the system bus. A shortcoming of such a previous technique is that a null cycle introduces latency and thereby reduces the system bus's overall information throughput capacity and performance.

System 100 overcomes such a shortcoming in the example of FIG. 3. For example, referring to FIG. 3, during cycle 9 immediately after cycle 8, processor device 104 continues asserting CPU_OE__ to continue enabling driver 128, and processor device 104 outputs a read address RA through enabled driver 128 to AD bus 103. This is true during cycle 9, even though processor device 104 finished outputting data information WD3 through AD bus 103 during the immediately preceding cycle 8. Accordingly, cycle 9 advantageously is not a null period in FIG. 3, and this likewise is true if processor device 104 outputs another write address (instead of read address RA) to AD bus 103 in FIG. 3 during cycle 9. In either situation, during cycle 9, processor device 104 continues maintaining (i.e. does not relinquish) control (i.e. "ownership") of system bus 102, and bus arbitration circuitry 108 recognizes this fact as indicated in FIG. 3 by bus arbitration circuitry 108 continuing to assert BG__ during cycles 9 and 10.

By comparison, referring to FIG. 2, with respect to AD bus 103, cycle 9 is a null period during which no further activity occurs on AD bus 103. This is because control of AD bus 103 is transferred from memory device 106 to processor device 104 during cycles 9 and 10. Such a transfer of control is indicated in FIG. 2 by memory device 106 setting TARGET_OE__ to a logic 1 state during cycle 9, and by processor device 104 asserting CPU_OE__ during cycle 10. This is consistent with the fact that memory device 106 is the device which finished outputting data information RD3 through AD bus 103 during the preceding cycle 8, whereas processor device 104 is the device which outputs a write address WA through AD bus 103 during the subsequent cycle 10.

Accordingly, cycle 9 (immediately after cycle 8) is a null cycle in FIG. 2. In contrast, as discussed above, cycle 9 advantageously is not a null cycle in FIG. 3. Since cycle 9 advantageously is not a null cycle in FIG. 3, overall information throughput capacity and performance of system bus 102 are improved with system 100 of the illustrative embodiment.

Notably, a null period occurs in FIG. 3 during cycle 10 which is the cycle immediately after cycle 9. However, such a null period in FIG. 3 during cycle 10 is comparable to the null period in FIG. 2 during cycle 4 (rather than being comparable to the null period in FIG. 2 during cycle 9). More particularly, in FIG. 3, processor device 104 outputs read address RA during cycle 9, and cycle 10 is a null period. Likewise, in FIG. 2, processor device 104 outputs read address RA during cycle 3, and cycle 4 is a null period. Accordingly, FIG. 2 has two null periods (i.e. cycles 4 and 9), whereas FIG. 3 advantageously has only one null period (i.e. cycle 10).

Although an illustrative embodiment and its advantages have been described in detail hereinabove, they have been described as example and not as limitation. Various changes, substitutions and alterations can be made in the illustrative embodiment without departing from the breadth, scope and spirit of the present inventions.

What is claimed is:

1. A method, comprising:

during a first cycle, outputting first data associated with a first address through a bus operating in a multiplex mode from a processor coupled to said bus;

retaining control of said bus by said processor in transition from said first cycle to a second cycle;

during said second cycle immediately after said first cycle, outputting a second address through said bus from said processor;

retaining control of said bus by said processor in transition from said second cycle to a third cycle; and during said third cycle immediately after said second cycle, communicating second data associated with said second address through said bus between said processor and a second device.

2. The method of claim 1 further comprising:

storing particular first data at an address within said second device coupled to said bus;

during said third cycle outputting data stored in said second device through said bus in response to said second address.

3. The method of claim 2 wherein said second device is a memory device.

4. The method of claim 2 and comprising:

during said first cycle, receiving said data at said second device from said bus; and during said first cycle, storing said received data within said second device.

5. The method of claim 1 wherein said step of outputting said first data comprises:

during said first cycle, enabling a tri-state driver coupled between said processor and said bus; and during said first cycle, outputting said first data from said processor through said enabled tri-state driver.

6. The method of claim 5 and comprising:

during a preceding cycle before said first cycle, enabling said tri-state driver so that said tri-state driver is enabled continuously between said preceding and first cycles.

7. The method of claim 5 wherein said step of outputting said second address comprises:

during said second cycle, enabling said tri-state driver; and during said second cycle, outputting said second address through said enabled tri-state driver.

8. The method of claim 7 wherein said tri-state driver is enabled continuously between said first and second cycles.

9. The method of claim 5 and comprising:

during an intervening cycle before said third cycle and after said second cycle, disabling said tri-state driver so that said tri-state driver is continuously disabled between said intervening and third cycles.

10. A system, comprising:

a bus operated in a multiplex mode;

a processor coupled to said bus with means for:

during a first cycle, outputting first data associated with a first address through said bus from said processor;

retaining control of said bus by said processor in transition from said first cycle to a second cycle;

during said second cycle immediately after said first cycle, outputting a second address through said bus from said processor;

retaining control of said bus by said processor in transition from said second cycle to a third cycle; and during said third cycle immediately after said second cycle, communicating second data associated with said second address through said bus between said processor and a second device.

11. The system of claim 10 comprising in said second device means for:

storing particular first data at an address within said second device coupled to said bus;

during said third cycle outputting data stored in said second device through said bus in response to said second address.

12. The system of claim 11 wherein said second device is a memory device.

13. The system of claim 11 wherein, during said first cycle, said second device is operable to receive said data from said bus and to store said received data within said second device.

14. The system of claim 10 and comprising a tri-state driver coupled between said processor and said bus, wherein:

during said first cycle, said processor is operable to enable said tri-state driver to output said data through said enabled tri-state driver.

15. The system of claim 14 wherein:

during a preceding cycle before said first cycle, said processor is operable to enable said tri-state driver so that said tri-state driver is enabled continuously between said preceding and first cycles.

16. The system of claim 14 wherein said tri-state driver is integral with said processor.

17. The system of claim 14 wherein:

during said second cycle, said processor is operable to enable said tri-state driver to output said address through said enabled tri-state driver.

18. The system of claim 17 wherein said processor is operable to enable said tri-state driver continuously between said first and second cycles.

19. The system of claim 14 wherein said first processor is operable to disable said first tri-state driver during an intervening cycle before said third cycle and after said second cycle, so that said first tri-state driver is continuously disabled between said intervening and third cycles.

20. The system of claim 14 wherein said second tri-state driver is integral with said second device.

21. A system, comprising:

a system bus operated in a multiplex mode;

a first tri-state driver having an input and an output, said output being coupled to said system bus;

a second tri-state driver having an input and an output, said output being coupled to said system bus;

a memory device coupled to said system bus and to said input of said first tri-state driver for storing data at an address within said memory device;

a processor device coupled to said system bus and to said input of said second tri-state driver for:

during a first cycle, enabling said second tri-state driver and outputting data through said enabled second tri-state driver to said system bus; and retaining control of said system bus by said processor device during transition from said first cycle to a second cycle;

during said second cycle immediately after said first cycle, enabling said second tri-state driver and outputting an address through said enabled second tri-state driver to said system bus;

wherein during a third cycle after said second cycle, said memory device is operable to enable said first tri-state driver and to output data through said enabled first tri-state driver to said system bus in response to said address; and wherein during said third cycle, said processor device is operable to enable said second tri-state driver to receive said output data from said system bus.

22. The system of claim 21 wherein, during said first cycle, said memory device is operable to receive said data from said system bus and to store said received data within said memory device.

23. The system of claim 21 wherein:

during a preceding cycle before said first cycle, said processor device is operable to enable said second tri-state driver so that said second tri-state driver is enabled continuously between said preceding and first cycles.

24. The system of claim 21 wherein said processor device is operable to enable said second tri-state driver continuously between said first and second cycles.

25. The system of claim 21 wherein said processor device is operable to disable said second tri-state driver during an intervening cycle before said third cycle and after said second cycle, so that said second tri-state driver is continuously disabled between said intervening and third cycles.

26. The system of claim 21 wherein said first tri-state driver is integral with said memory device.

27. The system of claim 21 wherein said second tri-state driver is integral with said processor device.

* * * * *